United States Patent [19]
Takayama et al.

[11] Patent Number: 5,390,342
[45] Date of Patent: Feb. 14, 1995

[54] RECEIVER USING SELECTIVE DIVERSITY RECEIVING SYSTEM

[75] Inventors: Masami Takayama; Toshihito Ichikawa, both of Kawagoe, Japan

[73] Assignee: Pioneer Electronic Corporation, Tokyo, Japan

[21] Appl. No.: 667,931

[22] Filed: Mar. 12, 1991

[30] Foreign Application Priority Data

Mar. 14, 1990 [JP] Japan ................................ 2-63313
Mar. 14, 1990 [JP] Japan ................................ 2-63315

[51] Int. Cl.⁶ ............................................ H04B 17/02
[52] U.S. Cl. ................................... 455/134; 455/135; 455/136; 455/140; 395/900
[58] Field of Search ............... 455/134, 135, 136, 140, 455/277.1, 277.2; 395/900

[56] References Cited

U.S. PATENT DOCUMENTS

| | | | |
|---|---|---|---|
| 4,204,164 | 5/1980 | Kage ................................... | 455/135 |
| 4,756,023 | 7/1988 | Kojima . | |
| 5,201,062 | 4/1993 | Nakamura et al. ................. | 455/296 |
| 5,263,184 | 11/1993 | Nakamura et al. ............... | 455/226.2 |

FOREIGN PATENT DOCUMENTS 0241793 10/1987 European Pat. Off. .
0343538 11/1989 European Pat. Off. .

OTHER PUBLICATIONS

*IEEE Transcriptions*, "Expert System on a Chip: An Engine for Real-Time Approximate Reasoning", Togai et al. 1986, pp. 55–62.
Neural Networks and Fuzzy Logic Tools of Promise for Controls. Tom McCusker May 1990.

*Primary Examiner*—Reinhard J. Eisenzopf
*Assistant Examiner*—Andrew Faile
*Attorney, Agent, or Firm*—Sughrue, Mion, Zinn, Macpeak & Seas

[57] ABSTRACT

A receiver has a plurality of receiving systems connected to a plurality of antennas, respectively, and a selective switching circuit for carrying out selective switching between output signals from the plurality of receiving systems to output an output signal from a receiving system in the most satisfactory receiving state, wherein the selective switching circuit has a fuzzy inference operation unit for discriminating receiving states of respective receiving states by a fuzzy inference. Accordingly, it is possible to synthetically judge the receiving state of the receiver to easily and stably select the optimum receiving system in the receiver.

8 Claims, 9 Drawing Sheets

STATE BEFORE MEMBERSHIP FUNCTION IS ALTERED

STATE AFTER MEMBERSHIP FUNCTION IS ALTERED

RECEIVER USING SELECTIVE DIVERSITY RECEIVING SYSTEM

BACKGROUND OF THE INVENTION

This invent ion relates to a receiver, and more particularly to a radio receiver using a selective diversity receiving system.

Hitherto, as the receiving system using a plurality of antennas to provide an optimum receiving state, the diversity receiving system is well known. For the diversity receiving system, there are systems such as the selective diversity system, a switching diversity system, and the like. Explanation will now be given by taking an example of the selective diversity system.

In accordance with the selective diversity system, a plurality of receiving systems connected to respective antennas are sequentially selected by a selector to use, as a receiving signal, an output from a receiving system in the most satisfactory receiving state.

An example of the receiver of the conventional selective diversity system will now be described. The receiver roughly comprises two receiving systems, a selector for selecting any one of outputs from these two receiving systems, and a diversity controller for controlling the selector.

Each receiving system comprises a receiving circuit connected to an antenna to process an RF (Radio Frequency) signal to output a received signal, and a receiving level detection circuit for detecting a receiving level signal (e.g., an S-meter level signal) corresponding to a field strength to output a receiving level signal.

In each receiving system, the receiving circuit receives an RF signal from the antenna to output a received signal to the selector. The receiving level detection circuit detects a receiving level, e.g., from an output signal from circuits succeeding to a detector of the receiving circuit to output a detection signal to the diversity controller as a receiving level signal.

The diversity controller outputs, to the selector, a selector control signal for selecting either of receiving systems on the basis of respective receiving level signals. The selector selects either of received output signals on the basis of the selector control signal to output a selected one as a selected received output signal. Thus, the selector outputs an output signal corresponding to a receiving system in the most satisfactory receiving state.

In this way, the receiver selects a receiving system in a more satisfactory receiving state from these two receiving systems to maintain a satisfactory receiving state at all times.

However, the above-mentioned diversity receiver has a problem that selection of the receiving system is not necessarily precisely conducted.

Namely, the diversity controller generates a selector control signal either on the basis of a receiving level signal, or on the basis of a noise level signal, and both the received signal and the noise level are not considered at the same time. As a result, there might occur inconveniences such that if the receiving level is high, the received signal is selected even in the case where the level of the noise signal is high, so an optimum receiving system is not necessarily selected.

On the other hand, when attention is drawn to the internal problem of the receiving system, there are instances where there may occur small differences in the power gain of the front ends of the two respective receiving systems. To compensate such an unevenness in the operating characteristic (amplification degree), it is conceivable to use a gain controller. However, using the gain controller at high frequency circuits such as a front end, etc. is not preferable in view of generation of noise.

SUMMARY OF THE INVENTION

With the above-described problems in view, an object of this invention is to provide a receiver capable of easily and stably selecting a receiving system in the most satisfactory receiving state.

In accordance with this invention, there is provided a receiver comprising a plurality of receiving systems connected to a plurality of antennas, respectively, and a selective switching circuit for carrying out selective switching between output signals from the plurality of receiving systems to output an output signal from a receiving system in the most satisfactory receiving state, wherein the selective switching circuit comprises discrimination means for respectively discriminating receiving states of the receiving systems by a fuzzy inference operation on the basis of received signals from the receiving systems to compare with each other discriminated results with respect to the respective receiving systems to output a select signal in the most satisfactory receiving system.

According to this invention, a plurality of antennas process an input signal from the antennas, respectively, to output a received signal.

A discrimination means discriminates receiving states of respective receiving system by a fuzzy inference operation on the basis of received signals from the respective receiving systems to compare with each other discriminated results with respect to respective receiving systems, thus to a select signal in the most satisfactory receiving system.

The select means switches and outputs the received signal in the most satisfactory receiving system on the basis of the select signal.

Therefore, the selective switching circuit can select receiving system in consideration of the operating characteristic with respect to each of the receiving system. Accordingly, a switching operation is carried out accurately.

DESCRIPTION OF THE PREFERRED EMBODIMENTS

Figure 9:
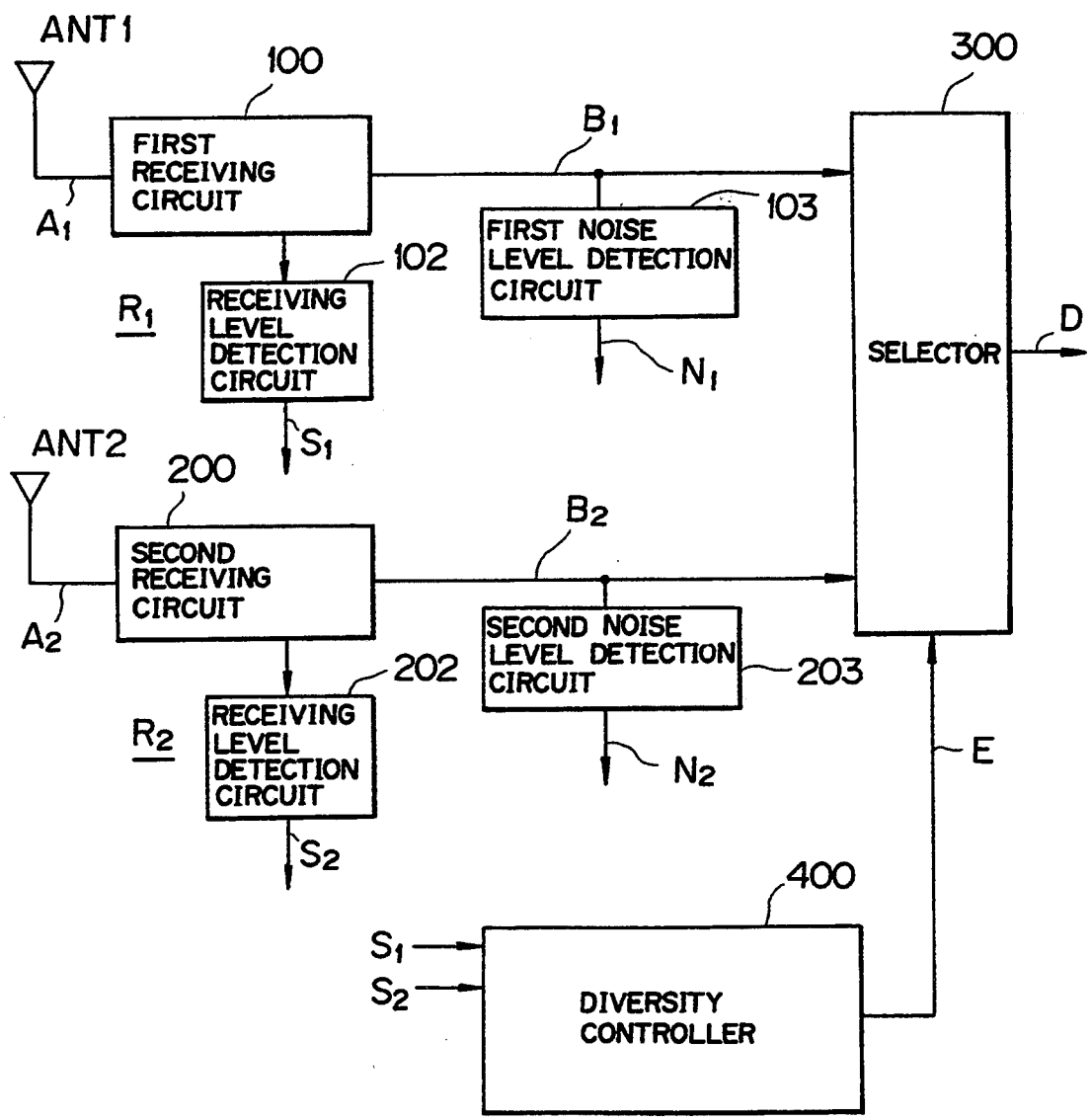
FIG. 9 is an explanatory view showing a conventional diversity receiver.

As conducive to a full understanding of the nature and utility of the present invention, a brief consideration of a typical conventional receiver will be first presented below with reference to FIG. 9 principally for the purpose of comparison therebetween.

As the receiving system using a plurality of antennas to provide an optimum receiving state, a diversity receiving system is known. The diversity receiving system includes a selective diversity system.

The receiver comprises first and second receiving systems $R_1$, $R_2$, a selector 300 for selecting any one of the outputs from these two receiving systems $R_1$, $R_2$ and a diversity controller 400 for controlling the selector 300.

The first receiving system $R_1$ comprises a first receiving circuit 100 connected to an antenna ANT1 to process an RF (Radio Frequency) signal $A_1$ to output a received signal $B_1$, a first receiving level detection circuit 102 for detecting a receiving level signal (e.g., an S-meter level signal) corresponding to a field strength to output a first receiving level signal, and a first noise level detection circuit 103 for detecting a signal level of noise included in the received output signal $B_1$ to output a first noise level signal. The first receiving circuit 100 is composed of a front end (not shown), an intermediate frequency amplifier, and a detector, etc. The first level detection circuit 102 detects a receiving level signal $S_1$, e.g., from an output signal extracted from circuits succeeding to the intermediate frequency amplifier or detector. The first noise level detection circuit 103 is composed of, e.g., a high-pass filter (not shown) to detect a noise level from an output signal level of the high-pass filter.

The second receiving system $R_2$ includes, in the same manner as in the first receiving system $R_1$, a second receiving circuit 200, a second receiving level detection circuit 202, and a second noise level detection circuit 203. Further, in the second receiving system $R_2$, a gain controller for controlling or adjusting a difference between the operating characteristic of the second receiving system $R_2$ and that of the first receiving system $R_1$ is provided in the second receiving circuit 200. For example, a volume for gain control is provided at the output terminal of a front end (not shown).

The diversity controller 400 outputs, to a selector 300, a selector control signal E for selecting any one of the first and second receiving systems on the basis of a receiving level signal and a noise level signal of the first or second receiving system $R_1$ or $R_2$.

The selector 300 outputs, as a selected received output signal D, the above-mentioned output signal provided by applying switching selection to output signals from the first and second receiving systems $R_1$, $R_2$ on the basis of a selector control signal E from the diversity controller 400.

The operation of the conventional receiver will now be described.

In the first receiving system $R_1$, the first receiving circuit 100 receives an. RF signal $A_1$ from the antenna ANT1 connected thereto to output a received signal $B_1$. The first receiving level detection circuit 102 detects a receiving level, e.g., from .an output signal from circuits succeeding to a detector (not shown) of the first receiving circuit 100 to output a first receiving level signal $S_1$. The first noise level detection circuit 103 detects a noise signal level included in the received output signal $B_1$ to output it as a first noise level signal $N_1$ to the diversity controller 400.

Similarly, in the second receiving system $R_1$, a second receiving level signal $S_2$ is outputted from the second receiving level detection circuit 202, to the diversity controller 400, and a second noise level signal $N_2$ is outputted from the second noise level detection circuit 103 to the diversity controller 400.

Thus, the diversity controller 400 outputs, to the selector 300, a selector control signal E for selecting any one of receiving systems on the basis of respective receiving level signals $S_1$ and $S_2$, or respective noise level signals $N_1$ and $N_2$.

The selector 300 outputs a selected signal on the basis of either the receiving level signals (S-meter level) $S_1$, $S_2$ or noise level signals $N_1$, $N_2$.

That is, the selection operation of the selector 300 is not carried out in consideration of both factors of the S-meter level and the noise level at the same time. Therefore, there are cases that even if the S-meter level is sufficiently high, the noise level is very high, and that even if the noise level is low, the S-meter level is also low. In this manner, a conventional receiver cannot necessarily maintain a satisfactory receiving state at all times.

Respective embodiments of this invention will now be described with reference to the attached drawings.

Figure 1:
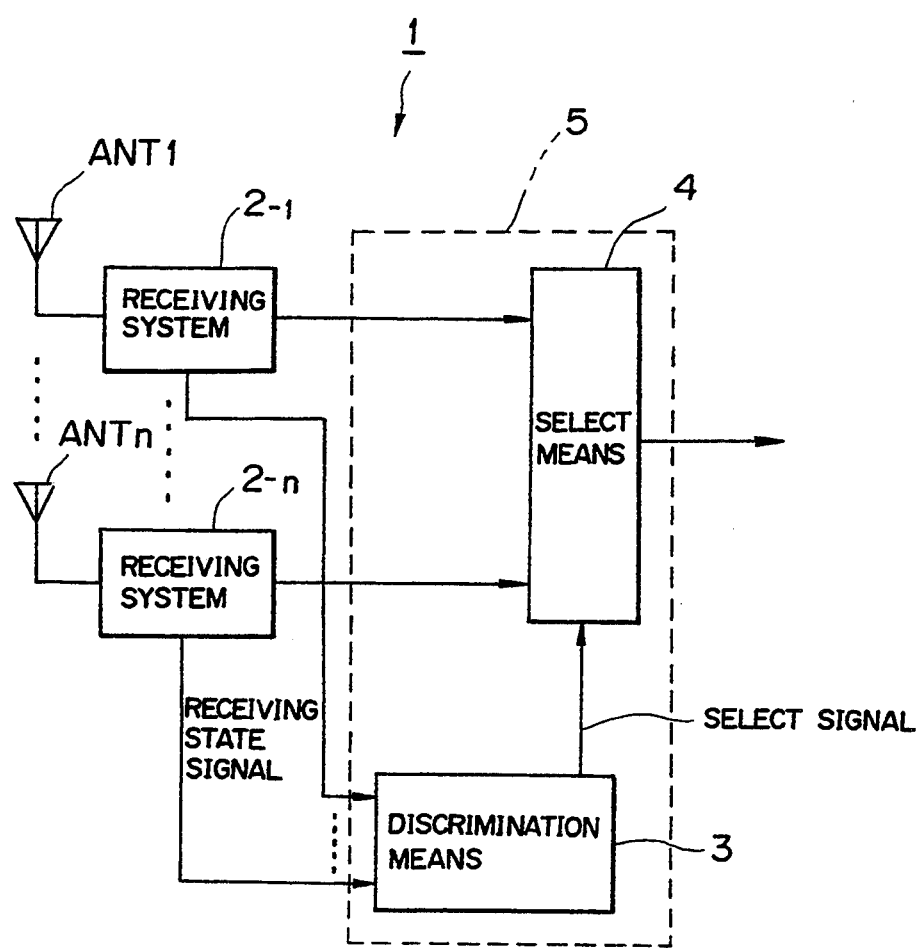
FIG. 1 is an explanatory view showing the principle of this invention.

The principle of this invention is described with reference to FIG. 1.

A receiver 1 of this invention comprises a plurality of receiving systems 2-1, 2-2, ... 2-n connected to a plurality of antennas ANT1–ANTn, respectively, and a selective switching circuit 5 for carrying out selective switching between output signals from said plurality of receiving systems 2-1, 2-2, ... 2-n to output an output signal of a receiving system in the most satisfactory receiving state. The selective switching circuit 5 comprises discrimination means 3 for discriminating receiving states of respective receiving systems by a fuzzy inference operation on the basis of received signals from the respective receiving systems to compare with each other discriminated results with respect to said respective receiving systems, thus to output a select signal in the most satisfactory receiving system.

Figure 2:
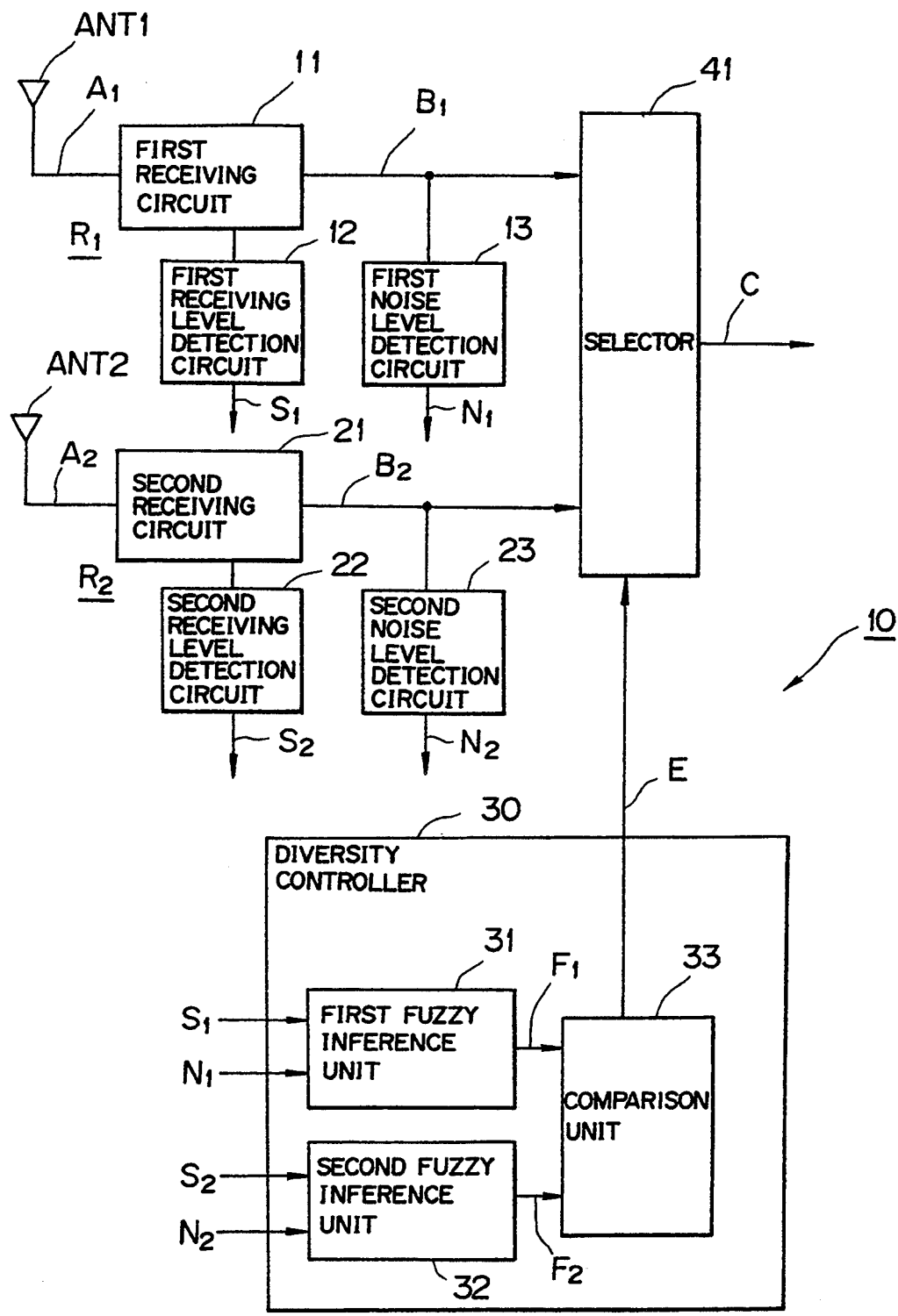
FIG. 2 is a block diagram showing a first embodiment.

A first embodiment of this invention will be first described with reference to FIG. 2. FIG. 2 shows a case where two receiving systems are provided.

A receiver 10 roughly comprises a first receiving system $R_1$ connected to an antenna ANT1, a second receiving system $R_2$ connected to an antenna ANT2, a selector 41 for selecting any one of the first and second receiving systems $R_1$, $R_2$ and a diversity controller 30 for controlling the selector 41.

The first receiving system $R_1$ comprises a first receiving circuit 11 for processing an RF signal $A_1$ from the antenna ANT1 to output a received signal $B_1$, a first receiving level detection circuit 12 for detecting a receiving level signal (e.g., S-meter level signal) corresponding to a field strength to output a first receiving level signal $S_1$, and a first noise level detection circuit 13 for detecting a signal level of noise included in the received output signal $B_1$ to output a first noise level signal $N_1$. The receiving circuit 11 comprises a front end (not shown), an intermediate frequency amplifier, and a detector, etc. The first level detection circuit 12 serves to detect a receiving level signal $S_1$, e.g., an output signal from circuits succeeding to the intermediate amplifier or the detector.

The second receiving system $R_2$ comprises, in the same manner as in the first receiving system $R_1$, a second receiving circuit 21, a second receiving level detection circuit 22 fop outputting a second receiving level signal $S_2$, and a second noise level detection circuit 23 for outputting a second noise level signal $N_2$ on the basis of noise included in the received output signal $B_2$.

The diversity controller 30 includes a CPU and a memo memory to perform a fuzzy ;inference operation by a program and a membership function included therein. More particularly, this controller 30 comprises a fuzzy inference operation on the basis of the first receiving level signal $S_1$ and the first noise level signal $N_1$ to output a first fuzzy inference result signal $F_1$, and a second fuzzy inference section 32 for performing a fuzzy inference operation on the basis of the second receiving level signal $S_2$ and the second noise level signal $N_2$ to output a second fuzzy inference result signal $F_2$. The controller 30 further comprises a comparison unit 33 adapted to output a selector control signal E for selecting any one of the first and second receiving systems $R_1$, $R_2$ on the basis of the first and second fuzzy inference result signals $F_1$ and $F_2$.

The comparison unit 33 is composed of, e.g., a comparator.

The selector 41 carries out switching between received signals $B_1$ and $B_2$ on the basis of the selector control signal E to output a selected one as a received output signal C.

The operation of the above-mentioned first embodiment will now be described.

In the first receiving system $R_1$, the first receiving circuit 11 processes an RF signal $A_1$ from the antenna ANT1 to output a received signal $B_1$. The first receiving level detection circuit 12 detects a receiving level, e.g., from an output signal extracted from circuits succeeding to a detector (not shown) of the first receiving circuit 11 to output a first receiving level detection signal $S_1$. The first noise level detection circuit 13 detects the level of a noise signal included in the received signal $B_1$ to output a first noise level detection signal $N_1$.

Similarly, in the second receiving system $R_2$, the second receiving circuit 21 processes an RF signal $A_1$ inputted from the antenna ANT2 to output a received signal $B_2$. The second receiving level detection circuit 22 detects a receiving level, e.g., from an output signal from circuits succeeding to a detector (not shown) of the second receiving system $R_2$ to output a second receiving level signal $S_2$. The second noise level detection circuit 23 detects the level of a noise signal included in the received signal $B_2$ to output a second noise level detection signal $N_2$.

To the diversity controller 30, the first and second receiving level signals $S_1$ end $S_2$, end the first end second noise level signals. $N_1$ end $N_2$ are inputted. The first fuzzy inference unit 31 outputs a first fuzzy inference result signal $F_1$ on the basis of a membership function set in advance by using the first receiving level signal $S_1$ and the first noise level signal $N_1$. More practically, the grade of the first receiving level signal $S_1$ is first determined from the membership function (FIG. 3(a)) showing the level of the first receiving level signal $S_1$. Then, the grade of the first noise level signal is determined on the basis of the membership function (FIG. 3(b)) showing the level of the first noise level signal $N_1$. Further, the grade of the receiving state is determined by Mini-max method, etc. on the basis of the grades of these respective signal levels (FIG. 3(c)) to output e first fuzzy inference result signal $F_1$ corresponding to that grade. Similarly, the second fuzzy inference unit 32 outputs a second fuzzy inference result signal on the basis of a membership function set in advance by using the second receiving level signal $S_2$ end the second noise level signal $N_2$. Thus, the comparison unit 33 outputs a selector control signal E for selecting the first or second receiving system in a more satisfactory receiving state on the basis of those fuzzy inference result signals $F_1$ and $F_2$.

The first selector 41 selectively outputs, as a received output signal C, a received signal in any one of the receiving systems $R_1$, $R_2$ on the basis of the selector control signal E.

Figures 3A, 3B, 3C:
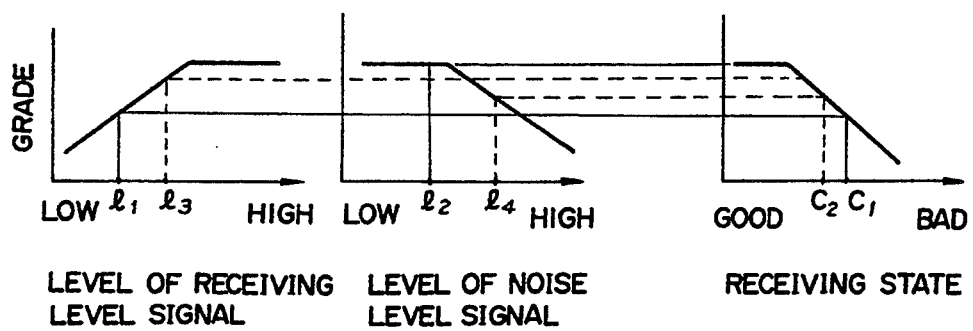
FIG. 3a–(c) are an explanatory view of a membership function.

For example, as shown in FIG. 3(a), suppose that the level of the signal $S_1$ is relatively low (level $l_1$) and that the level of the noise level signal $N_1$ is low (level $l_2$), the receiving condition is determined to be in an intermediate state (condition $C_1$) by selecting the lower grade with respect to a membership function of FIG. 3(c). Further, suppose that the level of the signal $S_2$ is relatively low (level $l_3$) and that the level of the noise signal $N_2$ is relatively high, the receiving condition is determined to be relatively good (condition $C_2$). Then, the two conditions $C_1$, $C_2$ are compared with each other through the comparison unit 33 to select the second receiving system $R_2$.

Figure 8:
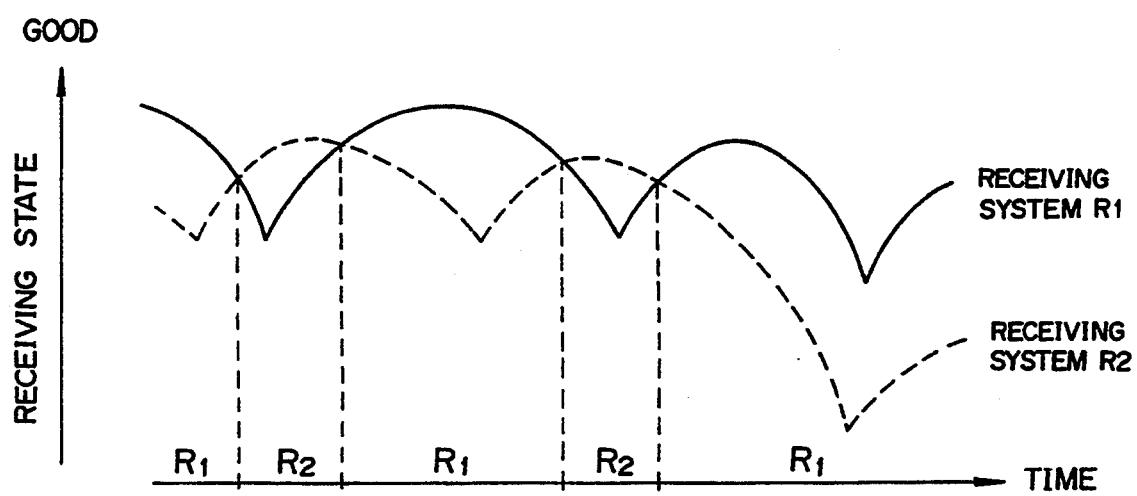
FIG. 8 is an explanatory view of a receiving circuit selective operation.

In this manner, a better receiving system can be selected alternately as shown in FIG. 8.

As described above, in accordance with this embodiment, an approach is employed to carry out the fuzzy inference on the basis of-the receiving level signals and the noise level signals of the respective receiving systems to compare fuzzy inference results of the respective receiving systems with each other thereby to make a selection of .the receiving systems. Thus, the optimum receiving system can be easily selected without setting in advance a rigorous condition for the optimum receiving state.

Second Embodiment

Figure 4:
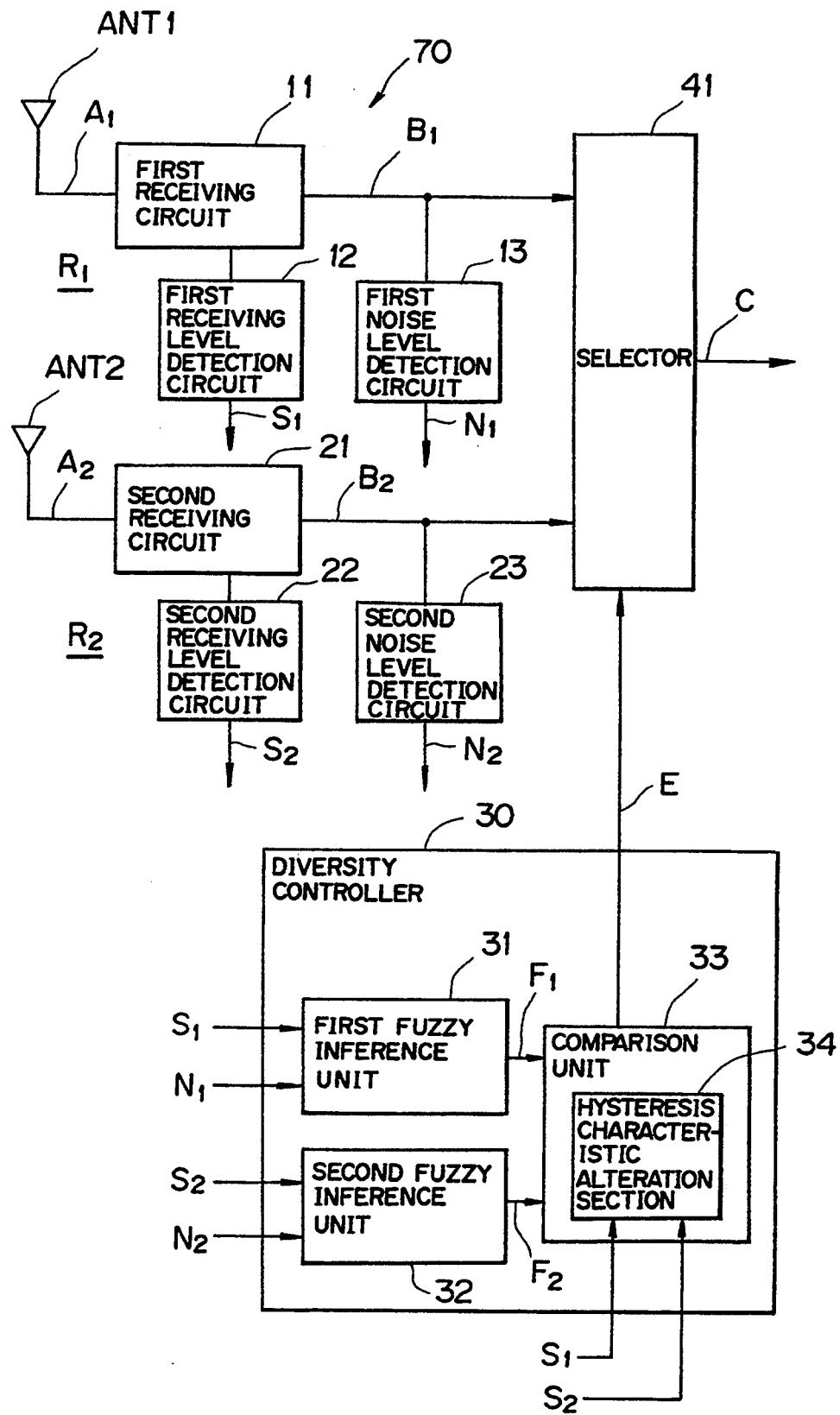
FIG. 4 is a block diagram showing a second embodiment.

A second embodiment of this invention will now be described with reference to FIG. 4. FIG. 4 shows a receiver 70 having two receiving systems $R_1$, $R_2$. The same reference numerals are attached to the same portions as those of the first embodiment, respectively, and their explanation will be conducted.

The second embodiment differs from the first embodiment in that the comparison unit 33 has a hysteresis characteristic in order that switching of the receiving system is not frequently carried out -when the receiving level signal suddenly changes, and that there is provided in the comparison unit 33 a hysteresis characteristic alteration section 34 having a function to alter the hysteresis characteristic on the basis of a receiving level signal.

Figure 5A:
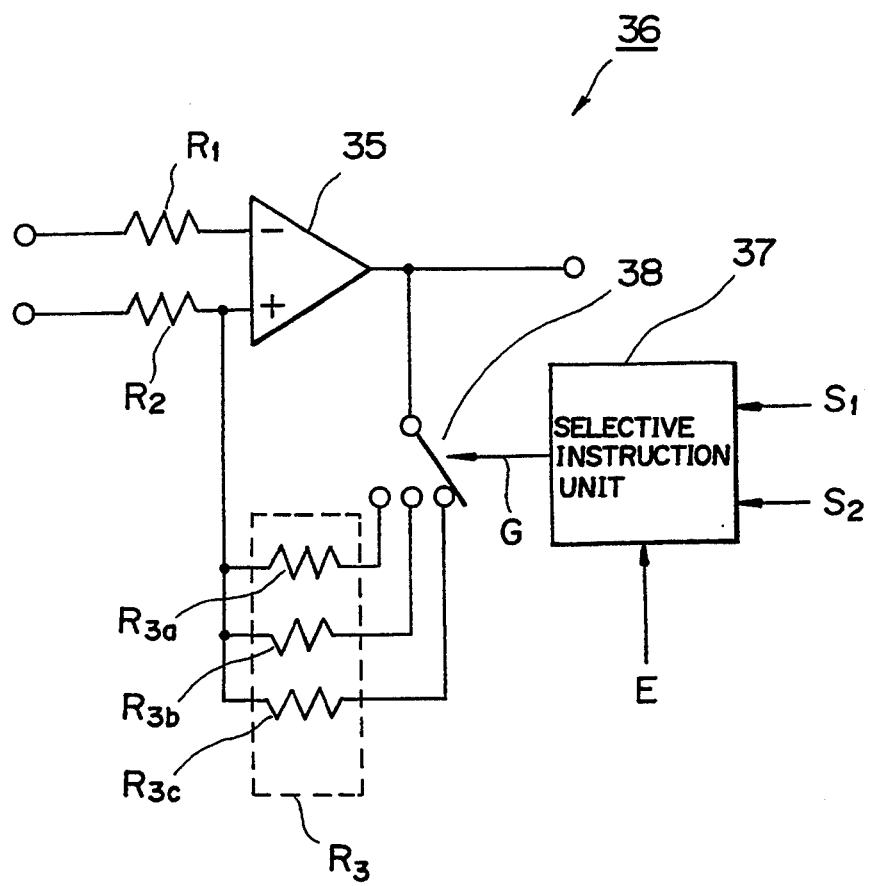
FIG. 5 is an explanatory view of a comparison unit.

The comparison unit 33 provided with the hysterisis characteristic alteration section 34 comprises, as shown in FIG. 5(a), a Schmitt circuit 36 including an operational amplifier 35, two input resistors $R_1$ and $R_2$, and a group of feedback resistors $R_3$ which can be switched, a switching instructing section 37 adapted to output a switching instruction signal G for carrying out selective switching between feedback resistors $R_3$ on the basis of a receiving level signal corresponding to a receiving system selected on the basis of the selector control signal E, and a changeover switch 38 or carrying out selective switching between feedback resistors $R_{3a}$, $R_{3b}$, $R_{3c}$ on the basis of the switching instruction signal G.

The operation of the second embodiment will now be described.

In the first receiving system $R_1$, the first receiving circuit 11 processes an RF signal $A_1$ inputted from the antenna ANT1 to output a signal such as a received signal $B_1$, etc. The first receiving level detection circuit 12 detects a receiving level from an inputted signal to output a first receiving level detection signal $S_1$. The first noise level detection circuit 13 detects the level of a noise signal included in the received signal $B_1$ to output a first noise level detection signal $N_1$.

Similarly, in the second receiving system $R_2$, the second receiving circuit 21 processes an RF signal inputted from the antenna ANT2 to output a received signal $B_2$. The second receiving level detection circuit 22 detects a receiving level from an inputted signal to output a second receiving level signal $S_2$. The second noise level detection circuit 23 detects the level of a noise signal included in the received signal $B_2$ to output a second noise level detection signal $N_2$.

Figure 5B:
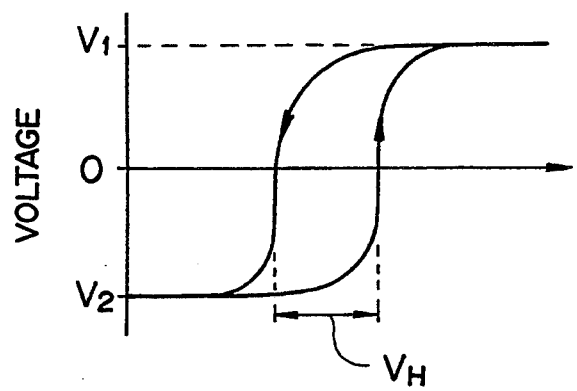

To the diversity controller 30, first and second receiving level signals $S_1$ and $S_2$ and first and second noise level signals $N_1$ and $N_2$ are inputted. The first fuzzy inference unit 31 outputs a first fuzzy inference result signal $F_1$ on the basis of a membership function set in advance by using the first receiving level signal $S_1$ and the first noise level signal $N_1$. The second fuzzy inference unit 32 outputs a second fuzzy inference result signal $F_2$ on the basis of a membership function set in advance by using the second receiving level signal $S_2$ and the second noise level signal $N_2$. The switching instructing unit 37 outputs a switching instruction signal G for carrying out selective switching between feedback resistors $R_3$ on the basis of a receiving level signal corresponding to the selector control signal E. Thus, selective switching between feedback resistors $R_{3a}$, $R_{3b}$, $R_{3c}$ of the Schmitt circuit 36 is carried out by means of the changeover switch 38. As a result, the hysteresis voltage $V_H$ (see FIG. 5(b)) is expressed as follows:

$$V_H = R_2/(R_2+R_3) \times (V_1 - V_2)$$

where $V_1$ is a power supply voltage on the plus side and $V_2$ is a power supply voltage on the minus side.

Accordingly, in the case where the receiving state is not good, when selection between the feedback resistors $R_{3a}$, $R_{3b}$, $R_{3c}$ is carried out so that the hysteresis voltage $V_H$ becomes large, there is no possibility that a select control signal E outputted from the comparison unit is frequently switched, thus making it possible to carry out a stable receiving operation.

The selector 41 selectively outputs a received signal in any one of receiving systems $R_1$, $R_2$ as a received output signal C on the basis of a selector control signal E.

As described above, in accordance with this embodiment, there is employed an arrangement such that when the receiving state is not good, the hysteresis voltage becomes large, thus preventing the receiving system from being switched frequently, while when the receiving state is good, the hysteresis voltage $V_H$ is reduced, thus to immediately select the optimum receiving system. Accordingly, in the case where the received signal level changes suddenly, occurrence of switching noise, etc. due to unnecessary switching is reduced, thus making it possible to select a receiving system in a satisfactory receiving state with ease and stably to maintain a satisfactory receiving state.

While, in the above-described second embodiment, switching between feedback resistors of the Schmitt circuit 36 is carried out on the basis of one receiving level signal, there may be employed an arrangement such that this switching is carried out by using a mean value of respective receiving level signals $S_1$, $S_2$. Further, there may be an arrangement such that weighting is applied to respective receiving level signals to use a mean value of the weighted signals. In addition, while switching between feedback resistors is carried out stepwise, such a switching is continuously carried out.

While explanation has been given only in the case of two receiving systems in the above-described respective embodiments, this invention can be applied to the case of three receiving systems or more.

In accordance with this invention, since the receiving states of respective receiving systems are determined by the fuzzy inference operation, it is possible to synthetically judge the receiving state without making in advance setting of a rigorous condition for selection of the optimum receiving system to select the optimum receiving system with ease and stably.

Figure 6:
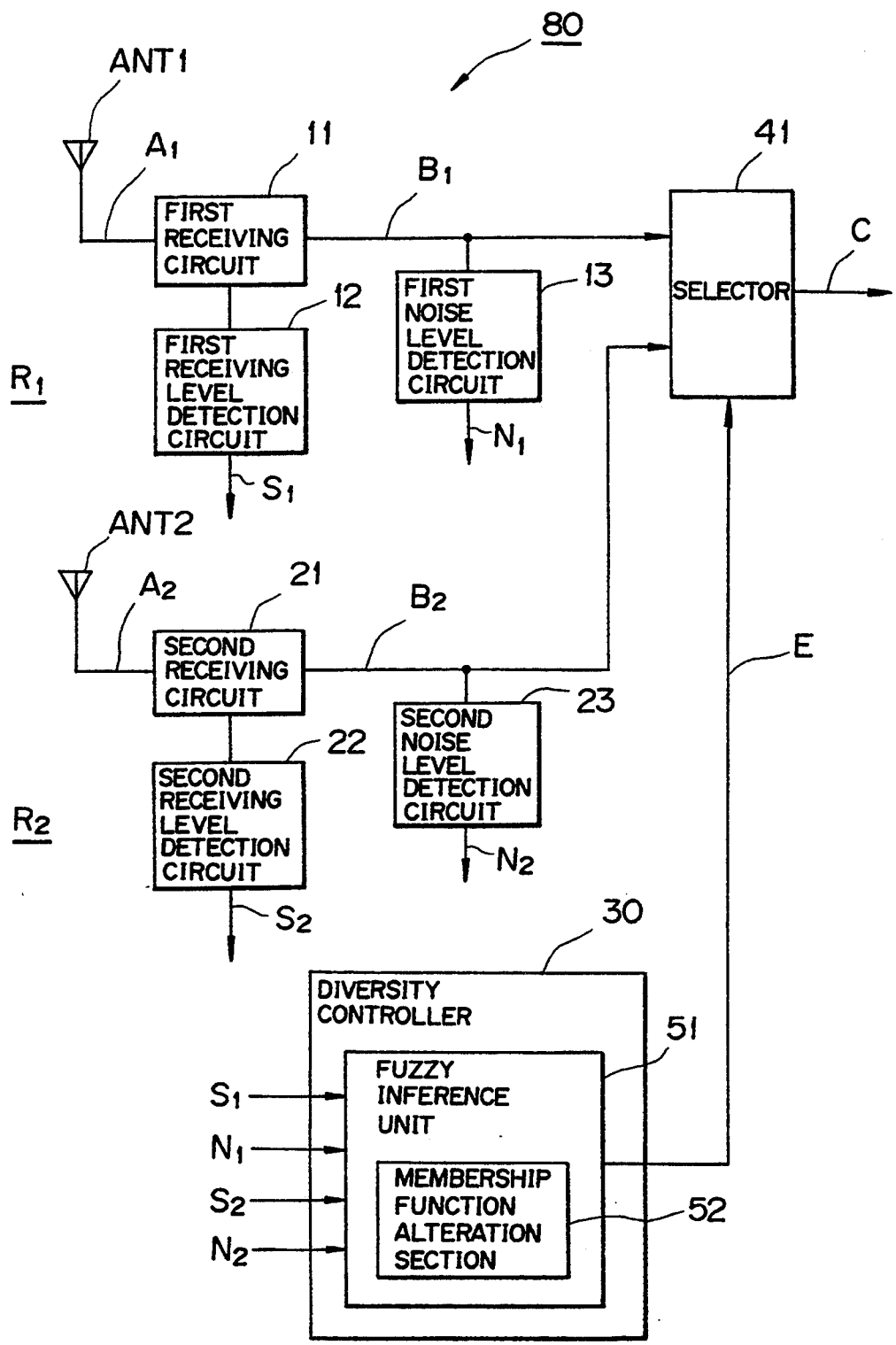
FIG. 6 is a block diagram showing a second embodiment of a diversity receiver.

Another embodiment of this invention will now be described with reference to FIGS. 6 and 7. FIG. 6, shows a case where two systems $R_1$, $R_2$ are provided in a receiver 80. The same reference numerals as those of the first embodiment are attached to portions which can carry out the same function and operation as those of the first embodiment, respectively, and explanation will be conducted.

The receiver 80 roughly comprises a first receiving system $R_1$ connected to the antenna ANT1, a second receiving system $R_1$ connected to the antenna ANT2, a selector 40 for selecting any one of outputs from the first and second receiving systems $R_1$, $R_2$ and a diversity controller 30 for controlling the selector 41.

The first receiving system $R_1$ comprises a first receiving circuit 11 for processing an RF signal $A_1$ from the antenna ANT1 to output a received signal $B_1$, a first receiving level signal detection circuit 12 for detecting a receiving level signal (e.g., S-meter level signal) corresponding to a field strength to output a first receiving level signal $S_1$, and a first noise level detection circuit 13 for detecting a signal level of noise included in the received output signal $B_1$ to output a first noise level signal $N_1$. The first receiving circuit 11 comprises a front end (not shown), an intermediate frequency amplifier, and a detector, etc. The first receiving level detection circuit 12 detects a receiving level signal $S_1$, e.g., from an output signal from circuits succeeding to the intermediate frequency amplifier or the detector. The first noise level detection circuit 13 is composed of, e.g., a high-pass filter (not shown) to detect the noise level by the output signal level of the high-pass filter.

The second receiving system $R_2$ includes, in the same manner as in the first receiving system $R_1$, a second receiving circuit 21, a second receiving level detection circuit 22 for outputting a second receiving level signal $S_2$, and a second noise level detection circuit 23 for outputting a second receiving level signal $N_2$.

The diversity controller 30 comprises a fuzzy inference unit 51 including a CPU to discriminate the receiving states of respective receiving systems by the fuzzy inference on the basis of the receiving level signal $S_1$ or $S_2$, and the noise level signals $N_1$ and $N_2$ of the first or second receiving system $R_1$ or $R_2$ in accordance with a program included to output a selector control signal E for selecting any one of the first and second receiving systems $R_1$, $R_2$.

The fuzzy inference unit 51 comprises a membership function alteration section 52 for altering the membership function with respect to each of receiving systems $R_1$, $R_2$ on the basis of unevenness of the operating characteristics of the respective receiving systems $R_1$, $R_2$. This membership function alteration section 52 serves to provide the optimum membership function in correspondence with the operating characteristics of the respective receiving systems.

The membership function alteration section 52 functions as follows.

Figure 7A:
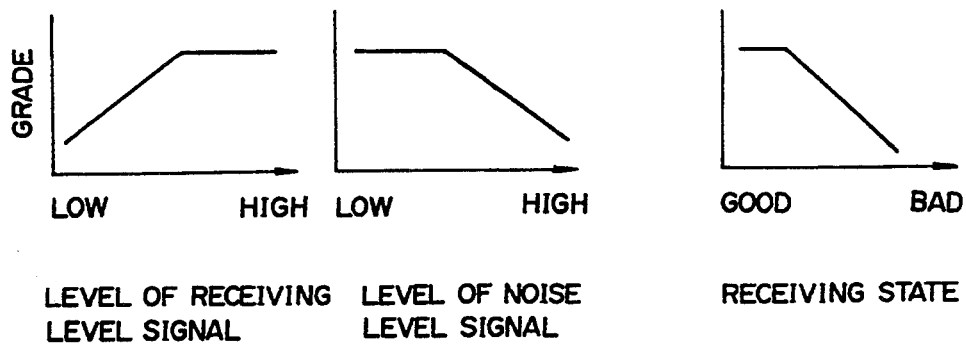
FIG. 7 is an explanatory view showing the states before and after the membership function is altered.
Figure 7B:
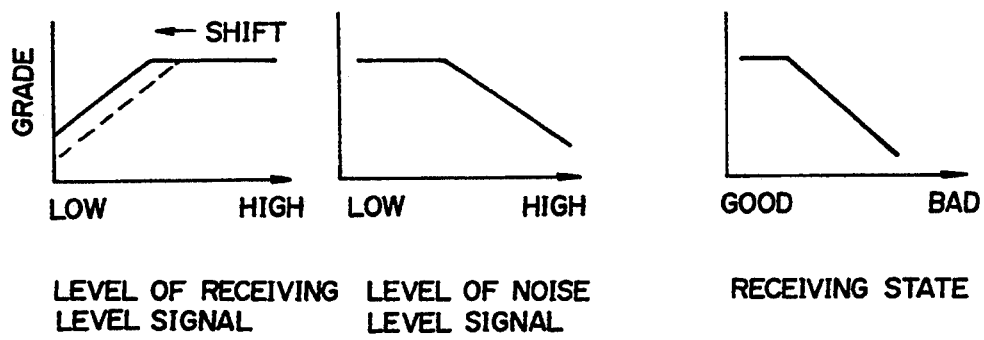

For example, assuming now that the membership function shown in FIG. 7(a) is in the state where it is not altered, where RF signals inputted to the first and second receiving systems $R_1$, $R_2$ are the same, when the second receiving level signal $S_2$ is smaller than the first receiving level signal $S_1$, the membership function alteration section 52 serves to shift, as shown in FIG. 7(b), a membership function with respect to the level of a receiving level signal applied to the second receiving level signal $S_2$ (the solid line indicates the shifted membership function). Thus, the second receiving level signal $S_2$ from the second receiving circuit 21 is not subjected to influence by unevenness of the operating characteristic. As a result, the receiving state can be precisely discriminated.

The operation of another embodiment will now be described.

In the first receiving system $R_1$, the first receiving circuit 11 processes an RF signal $A_1$ from the antenna ANT1 to output a received signal $B_1$. The first receiving level detection circuit 12 detects a receiving level, e.g., from an output signal from circuits succeeding to a detector (not shown) of the first receiving circuit 11 to output a first receiving level signal $S_1$. The first noise level detection circuit 13 detects the level of a noise signal included in the received signal $B_1$ to output a first noise level signal $N_1$.

Similarly, in the second receiving state, the second receiving circuit 21 processes an RF signal $A_1$ inputted from the antenna ANT2 to output a received signal $B_2$. The second receiving level detection circuit 22 detects the receiving level, e.g., from an output signal from the state succeeding to a detector (not shown) of the second receiving circuit to output a second receiving level signal $S_2$. The second noise level detection circuit 23 detects the level of a noise signal included in the received signal $B_2$ to output a second noise level signal $N_2$.

To the diversity controller 30, the first and second receiving level signals $S_1$ and $S_2$, and the first and second noise level signals $N_1$ and $N_2$ are inputted. The fuzzy inference unit 51 performs a fuzzy inference by using membership functions altered with respect to each of receiving systems $R_1$, $R_2$ to output a selector control signal E for selecting any one of first and second receiving systems $R_1$, $R_2$ in a more satisfactory receiving state. Therefore, it is not necessary to provide a gain controller of the front end of a system.

The selector 41 selectively receives a received signal of either the receiving system $R_1$ or $R_2$ on the basis of the selector control signal E to output a selected one as the output signal C.

As described above, in accordance with this embodiment, it is possible to alter the membership function in consideration of the operating characteristics with respect to each of the receiving systems $R_1$, $R_2$. Accordingly, selective switching operation is carried out without being subjected to the influence of the operating characteristics of respective receiving systems $R_1$, $R_2$, thus making it possible to select the optimum receiving system.

While explanation has been given in the above-mentioned embodiments only in the case where the membership function is shifted, there may be employed an arrangement to alter the gradient of the membership function, or to make an alteration to different functions. Further, alteration of the membership function can be carried out by making use of software, but there may be employed an arrangement to alter the membership function by using hardware, i.e., controlling, e.g., a function generator. Further, when there is employed an arrangement in which a reference signal generator is provided to permit the same reference signal (e.g., RF signal) to be inputted in respective receiving systems $R_1$, $R_2$, it is possible to alter the membership function in correspondence with changes in the operating characteristics with lapse of time of respective receiving systems $R_1$, $R_2$. Further, there may be employed an arrangement in which a circuit for detecting the operating environment of the receiver such as temperature around the receiver is provided to alter the membership function on the basis of the operating environment.

In addition, while explanation has been given in the above-described embodiments only in the case of two systems, this invention may be applied to the case of three systems or more.

In accordance with this invention, the fuzzy inference unit for discriminating states of respective receiving systems by the fuzzy inference is provided in the selective switching circuit. In this fuzzy inference unit, a membership function alteration section having a function to alter the membership function with respect to each of the systems is provided. Thus, the optimum receiving system can be selected without being subjected to the influence by unevenness of the operating characteristics of respective receiving systems.

What is claimed is:

1. A receiver, comprising:
a plurality of receiving systems connected to a plurality of respective antennas; and
a selective switching circuit for carrying out selective switching between output signals from said plurality of receiving systems to output a selected output signal of a receiving system having the most satisfactory receiving state,
said selective switching circuit comprising means for discriminating receiving states of respective receiving systems, said discrimination means comprising means for performing a fuzzy inference operation on the basis of a predetermined membership function and the output signals from the respective receiving systems and means for comparing discriminated results with each other with respect to said respective receiving systems, thus to output the selected output signal of the most satisfactory receiving system, wherein said means for performing a fuzzy inference operation comprises a fuzzy inference operation unit for performing a fuzzy inference operation on the basis of field strength detection signals and noise detection signals extracted from said output signals of the respective receiving systems to output an inference result signal, and said means for comparing comprises a comparison unit for comparing with each other said respective inference result signals to output a selected signal for selecting a receiving system having the most satisfactory state.

2. A receiver as set forth in claim 1, wherein said discrimination means has a hysteresis characteristic.

3. A receiver, comprising:
a plurality of receiving systems connected to a plurality of respective antennas; and
a selective switching circuit for carrying out selective switching between output signals from said plurality of receiving systems to output a selected output signal of a receiving system having the most satisfactory receiving state,
said selective switching circuit comprising means for discriminating receiving states of respective receiving systems, said discrimination means comprising means for performing a fuzzy inference operation on the basis of a predetermined membership function and the output signals from the respective receiving systems and means for comparing discriminated results with each other with respect to said respective receiving systems, thus to output the selected output signal of the most satisfactory receiving system, wherein said means for performing a fuzzy inference operation comprises a fuzzy inference operation unit for performing a fuzzy inference operation on the basis of field strength detection signals and noise detection signals extracted from said output signals of the respective receiving systems to output an inference result signal, and said means for comparing comprises a comparison unit for comparing with each other said respective inference result signals to output a selected signal for selecting a receiving system having the most satisfactory state,
wherein said discrimination means has a hysteresis characteristic, and
wherein said discrimination means further comprises a hysteresis characteristic alternation unit for altering said hysteresis characteristic at the time of comparison on the basis of the output signals from said receiving system.

4. A receiver as set forth in claim 3, wherein said hysteresis characteristic alteration unit includes means for altering the hysteresis characteristic on the basis of said field strength detection signals of said respective receiving system.

5. A receiver as set forth in claim 4, wherein said hysteresis characteristic alteration unit includes means for altering the hysteresis characteristic on the basis of a mean value of field strength detection signals of said respective receiving systems.

6. A receiver as set forth in claim 4, wherein said hysteresis characteristic altering means comprises feedback resistors connected between the input and output terminals of an operational amplifier constituting a Schmitt circuit and means for switching said feedback resistors.

7. A receiver, comprising:
a plurality of receiving systems connected to a plurality of respective antennas; and
a selective switching circuit for carrying out selective switching between output signals from said plurality of receiving systems to output an output signal of a receiving system having the most satisfactory receiving state,
said selective switching circuit comprising means for discriminating receiving states of respective receiving systems, said discrimination means comprising means for performing a fuzzy inference operation on the basis of a predetermined membership function and received signals from the respective receiving systems and means for comparing discriminated results with each other with respect to said respective receiving systems, thus to output a selected signal of the most satisfactory receiving system,
wherein said selective switching circuit further comprises a fuzzy inference operation unit for discriminating receiving states of respective receiving systems by a fuzzy inference operation, respectively, said fuzzy inference operation unit comprising a membership function alteration section including means for altering the membership function with respect to each of the systems.

8. A receiver as set forth in claim 7, further comprising means for changing the membership function in correspondence with a receiving state of any one of said plurality of receiving systems.

* * * * *